Nov. 24, 1925.

G. J. MEAD 1,563,037

VULCANIZATION APPARATUS

Filed March 3, 1921          11 Sheets-Sheet 1

GEORGE J. MEAD
INVENTOR

BY
ATTORNEY

Nov. 24, 1925.

G. J. MEAD 1,563,037

VULCANIZATION APPARATUS

Filed March 3, 1921     11 Sheets-Sheet 3

GEORGE J. MEAD
INVENTOR

BY *Hadley F. Freeman*
ATTORNEY

Nov. 24, 1925.

G. J. MEAD 1,563,037

VULCANIZATION APPARATUS

Filed March 3, 1921     11 Sheets-Sheet 4

FIG. 8.

GEORGE J. MEAD
INVENTOR

BY 
ATTORNEY

Nov. 24, 1925.    1,563,037
G. J. MEAD
VULCANIZATION APPARATUS
Filed March 3, 1921    11 Sheets-Sheet 6

GEORGE J. MEAD
INVENTOR

BY Hadley Freeman
ATTORNEY

Nov. 24, 1925.

G. J. MEAD 1,563,037

VULCANIZATION APPARATUS

Filed March 3, 1921 11 Sheets-Sheet 7

GEORGE J. MEAD
INVENTOR

BY Hadley Freeman
ATTORNEY

Nov. 24, 1925.  
G. J. MEAD  
1,563,037  
VULCANIZATION APPARATUS  
Filed March 3, 1921  11 Sheets-Sheet 8

GEORGE J. MEAD  
INVENTOR  
BY *Hadley Freeman*  
ATTORNEY

Nov. 24, 1925.

G. J. MEAD 1,563,037

VULCANIZATION APPARATUS

Filed March 3, 1921     11 Sheets-Sheet 9

GEORGE J. MEAD
INVENTOR

BY *Hadley J. Freeman*
ATTORNEY

Nov. 24, 1925.

G. J. MEAD 1,563,037

VULCANIZATION APPARATUS

Filed March 3, 1921          11 Sheets-Sheet 10

GEORGE J. MEAD
INVENTOR

BY
ATTORNEY

GEORGE J. MEAD
INVENTOR.

Patented Nov. 24, 1925.

1,563,037

UNITED STATES PATENT OFFICE.

GEORGE J. MEAD, OF MILWAUKEE, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

VULCANIZATION APPARATUS.

Application filed March 3, 1921. Serial No. 449,526.

*To all whom it may concern:*

Be it known that I, GEORGE J. MEAD, a citizen of the United States, and a resident of Milwaukee, in the county of Milwaukee and State of Wisconsin, have invented certain new and useful Improvements in Vulcanization Apparatus, of which the following is a specification.

My invention relates to vulcanization and the principal object of my invention is to provide a new and improved method and apparatus for vulcanization. In the drawings accompanying this specification and forming a part thereof I have shown, for purpose of illustration, one embodiment which my invention may assume.

In these drawings:

Figure 18 is an elevation of this same mechanism, Figure 18ª is a detail of a plunger for removing the heels from the mold cavity, Figure 27 is an elevation of the clamping mechanism, while

Figures 1, 2:
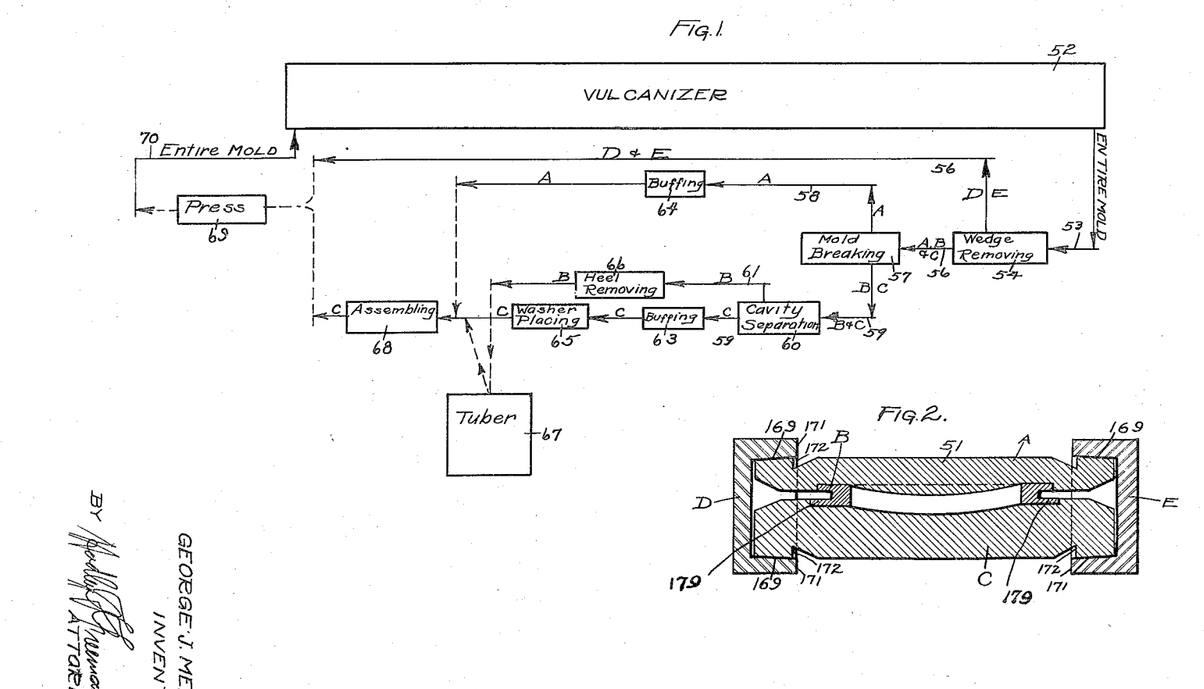
Figure 1 represents a general plan of the entire apparatus.
Figure 2 represents a section through a mold.

In Figure 1, I have shown a general plan of the illustrative embodiment of my invention which is herein disclosed. In this illustrative embodiment I have shown my invention as applied to the vulcanization of heels. In this embodiment I contemplate the use of a plurality of molds 51 designed to pass through a vulcanizer 52 and upon emerging from the vulcanizer 52 to be carried along the path 53 to a wedge removing device 54. This wedge removing device removes from the mold the wedges D and E which are carried onto a conveyor 55 while the remainder of the mold passes along the path 56 to the mold breaking device 57 wherein the top plate A is removed from the center and bottom plates B and C and dropped upon a conveyor 58. The bottom plates B and C are then carried by a conveyor 59 to a device 60 in which the center plate B is removed from the bottom plate C and dropped on a conveyor 61 while the bottom plate C remains upon conveyor 59. As the top and bottom plates A and C move along the conveyors 58 and 59 they encounter the buffers 63 and 64 and are buffed and cleaned thereby. After the bottom plate C has been buffed and while it is still moving along on conveyor 59 the washer placing operation takes place as indicated at 65. The middle section or center plate B has been carried under a heel removing device 66 and the completely formed heel has been pushed out by a plunger. This empty center plate is then placed in front of a tuber 67 and receives therefrom a new blank after which it is carried over and placed in position upon the bottom plate C and thereafter covered by the top plate A whereupon the three plates are carried by the conveyor 59 into the assembling device 68 after which the wedges D and E are placed upon the plates and the entire mold is placed in a press 69 and locked in assembled position. This entire mold is then carried by a conveyor 70 back into the vulcanizer 52.

Figures 3, 5:
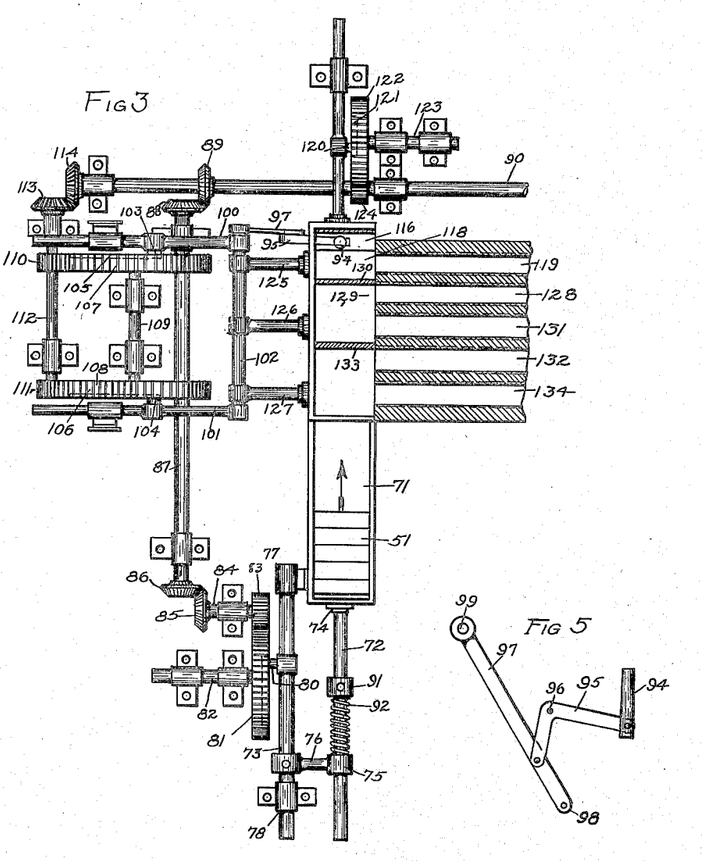
Figure 3 is a plan view of the mechanism for feeding the molds into the vulcanizer.
Figure 5 is a detail of a portion of this mechanism.
Figure 4:
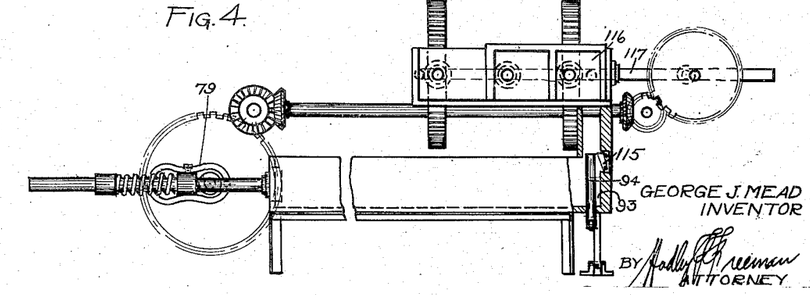
Figure 4 is an end view of this same mechanism.

The molds after they are locked into the assembled position are placed in a trough 71 to be acted upon by plunger 72 which advances periodically under the action of a parallel plunger 73. The advancing plunger 72 slides in a bearing 74 in the end of the trough 71 and is also guided by a loose collar 75 carried by an arm 76 secured to the parallel plunger 73. This parallel plunger 73 is guided in bearings 77 and 78 and is actuated by means of a cam 79 acting upon a pin 80 carried by the parallel plunger 73. The cam 79 is integral with a gear 81 which is supported upon a shaft 82 and is driven by a gear 83 carried by one end of the shaft 84 on the other end of which is a beveled gear 85 which meshes with a beveled gear 86 carried by the shaft 87 which is in turn driven by a beveled gear 88 integral therewith and meshing with a cooperative bevel gear 89 carried by the main shaft drive 90. In order to permit plunger 72 to properly advance the molds even when they are placed in the trough 71 at irregular intervals a loose connection is provided between the parallel plunger 73 and the advancing plunger 72 and this connection is formed by means of a collar 91 integral with the advancing plunger 72 against which bears one end of a compression spring 92 the other end of which bears against and is pressed by the collar 75 carried by arm 76 of the parallel plunger 73.

The molds 51 are advanced periodically along the trough 71 and finally the foremost mold comes into position against the end of the trough at 93 whereupon it is shortly thereafter raised by means of the plunger 94 operated by a bell-crank 95 pivoted at 96 and operated by a lever 97 which is pivoted at 98 and operated in turn at 99 by the plunger 100. This plunger 100 is part of a U shaped framework consisting of the plunger 100, the corresponding plunger 101, and the crossbar 102. The plungers 100 and 101 carry pins 103 and 104 which engage in cam grooves 105 and 106 in the gears 107 and 108 and in this manner permit the gears to reciprocate the U shaped frame. The two gears 107 and 108 are both mounted on the shaft 109 and are driven by the two gears 110 and 111 mounted on the shaft 112 which in turn is driven by a bevel gear 113 meshing with a cooperative bevel gear 114 on the main drive shaft 90.

When the mold 51 is raised by the plunger 94 it is engaged by the dog 115 and prevented thereby from returning to its lowered position. When sufficient molds have been raised by the plunger 94 one of the molds will reach a position as shown at 116 in front of the plunger 117 and thereupon at the next actuation of this plunger 117 will be carried from the position at 116 to a position at 118 directly in front of the first pass 119 of the vulcanizer 52. This plunger 117 is operated by means of a pin 120 which engages with a cam groove 121 in the gear 122 which is mounted upon a shaft 123 and driven by means of a co-operating gear 124 mounted upon the main drive shaft 90.

The cross-bar 102 of the U shaped frame 100—101—102 carries three plungers 125, 126, and 127 which are reciprocated with the cross bar 102. After the mold 52 has been placed in the position 118 the next subsequent advance movement of the plunger 125 will carry it into the pass 119 and it will thereupon commence its travel through the vulcanizer.

It will be apparent from the above that the molds are fed in and advanced first by the plunger 72, then by the plunger 94, then by the plunger 117, and finally by the plunger 125, and that these operations are continuous so that a continuous string of molds is being fed into the pass 119. On inspection of the driving connections between the various parts it also will be apparent that the plungers 72 and 117 operate coincidently and that the plungers 94 and 125 also operate coincidently and that each pair operates while the other pair is at rest.

Figure 6:
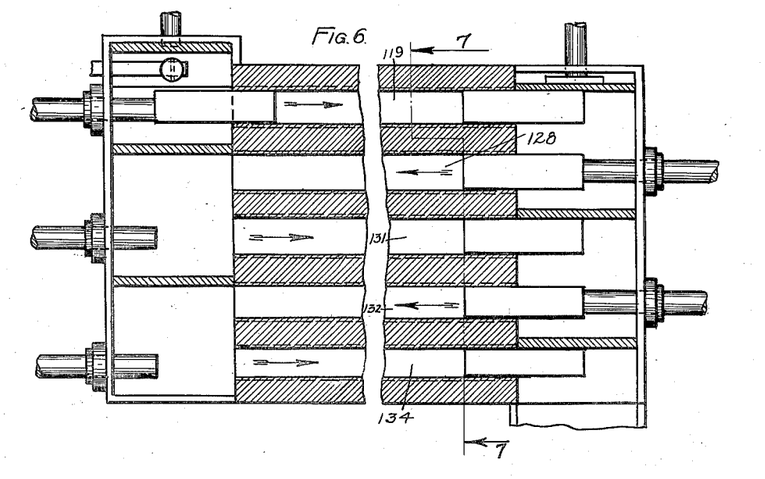
Figure 6 is a plan section of the vulcanizer.

Upon reaching the other end of the vulcanizer 51 the molds from the pass 119 are returned along the pass 128 and finally pushed out into the space 129 whereupon the succeeding advance movement of the plunger 117 will cause the finger 130 thereof to move the mold from the position 129 into a position opposite the pass 131 whereupon the succeeding advance movement of the plunger 126 will force the mold down the pass 131. Similarly the molds from the pass 131 are returned down the pass 132, carried forward by the finger 133, and then advanced by the plunger 127 down the last pass 134.

Figure 7:
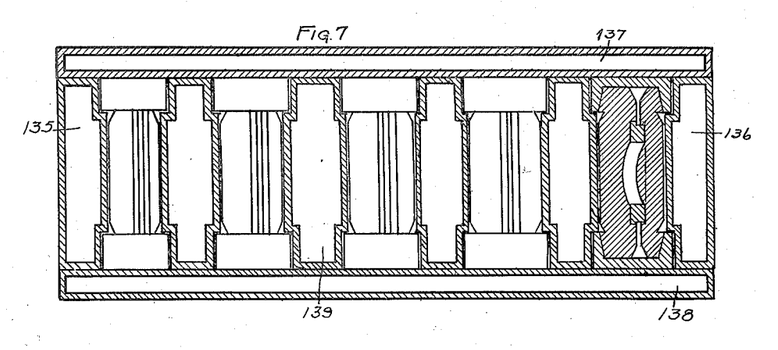
Figure 7 is a cross-section of the vulcanizer.

The molds are guided along the various passes by means of the sides 135 and 136, the top 137, the bottom 138, and the intermediate partitions 139. All of these guiding members are shaped to correspond with the mold contour and all of them are hollowed to form steam chambers to provide for the application of heat through the mold during its passage through the vulcanizer to thereby heat the raw stock within the molds and thereby vulcanize it.

Figure 8:
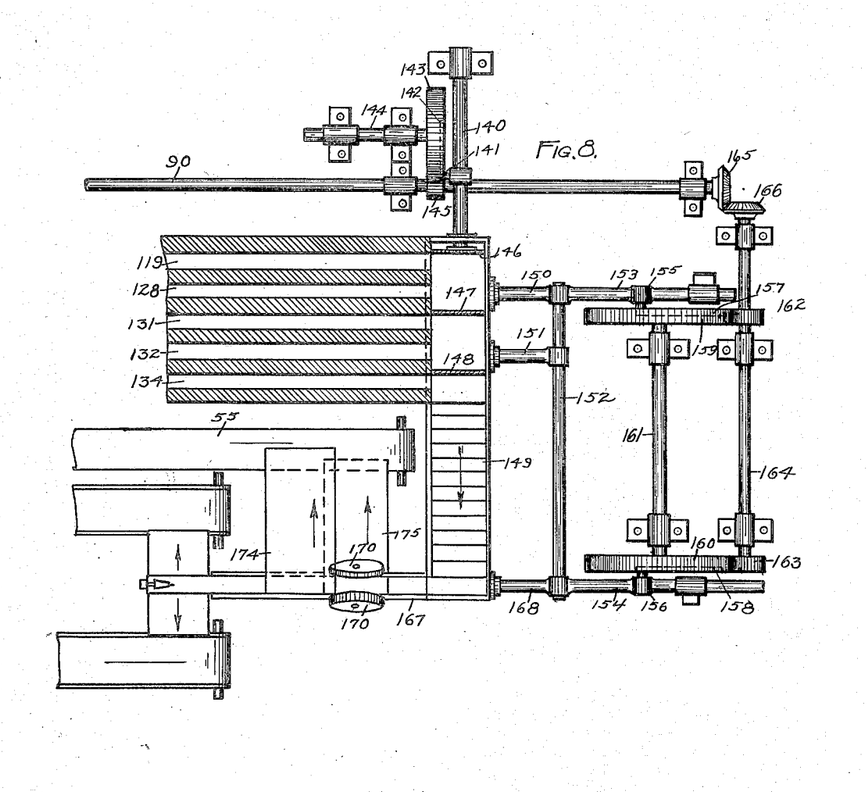
Figure 8 is a plan view of the mechanism for receiving the molds at the opposite end of the heater.
Figure 9:
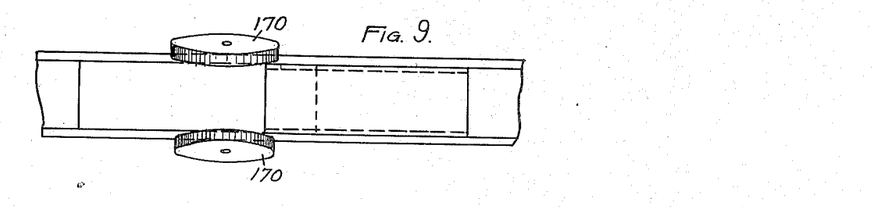
Figure 9 is a plan view of the apparatus for removing the mold locking device after vulcanization.

The shifting of the molds at the second end of the vulcanizer is accomplished by means of a plunger 140 driven by a pin 141 carried thereby and riding in the cam-groove 142 of a gear 143 which is mounted upon a shaft 144 and driven by means of a co-perative gear 145 mounted upon the main drive shaft 90. This plunger 140 carries a finger 146 for shifting the molds from the pass 119 to the pass 128 and a finger 147 for shifting the molds from the pass 131 to the pass 132 and a third finger 148 for shifting the molds from the pass 134 out into the channel 149. The molds are forced along the passes 128 and 132 by means of plungers 150 and 151 carried by a crossbar 152 which is in turn driven by the two plungers 153 and 154. These plungers 153 and 154 are driven by means of pins 155 and 156 which ride in grooves 157 and 158 in gear wheels 159 and 160 mounted upon a shaft 161 and driven by co-operative gear wheels 162 and 163 mounted upon a shaft 164. This shaft 164 is driven from the main drive shaft 90 by means of co-operating bevel gears 165 and 166 mounted respectively on the main drive shaft 90 and the jack shaft 164.

The molds from the trough 149 are forced out along a trough 167 by means of a plunger 168 also carried and operated by the crossbar 152.

It will be apparent from the above description and from the consideration of the drawings that the plungers 150, 151, and 168 operate coincidently and also operate coincidently with the plungers 125, 126, and 127, and that the plunger 140 operates coincidently with the plunger 117, and that each plunger or set of plungers operate therefore while the other plunger or set of plungers is at rest.

Figure 10:
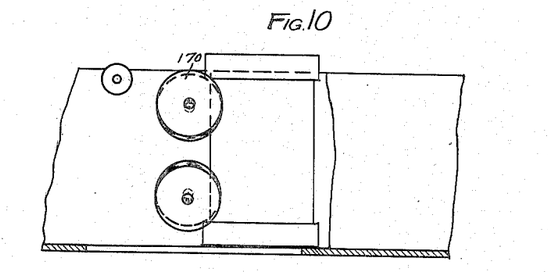
Figure 10 is an elevation of this same mechanism showing the mechanism about to begin operation.
Figure 11:
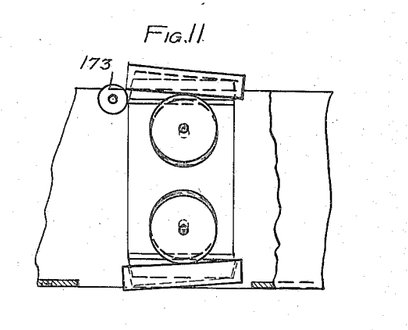
Figure 11 is another elevation of the same mechanism showing the locking device partially removed.
Figure 12:
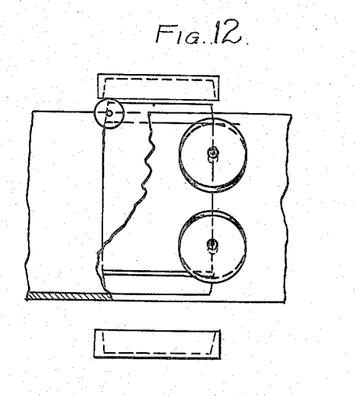
Figure 12 is an elevation of the same mechanism showing the locking device completely removed.
Figure 13:
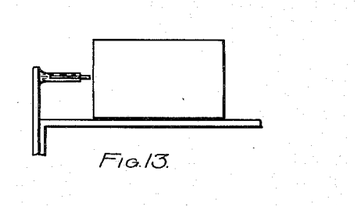
Figure 13 is an elevation showing the unlocked mold approaching the separating mechanism.
Figure 14:
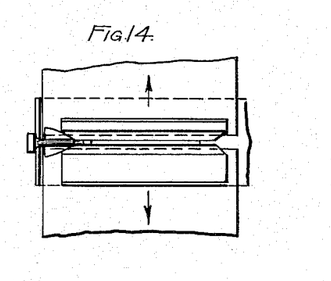
Figure 14 is a plan view showing the mold as it reaches the separator.
Figure 15:
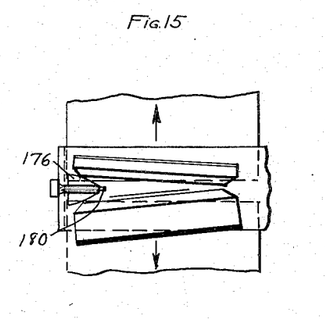
Figure 15 shows the mold partially separated.

Referring to the molds as shown in Figure 2 it will be seen that this mold consists of a top plate A and a bottom plate C both of which are recessed to receive the center plate B. It will also be seen that the side plates A and C are tapered at the edges as shown at 169 to receive wedging elements D and E which serve to hold the three plates of the mold in assembled relation. As the molds are projected along the channel 167 by the plunger 168 they are forced into contact with a set of rollers 170 which engage the edges 171 of the wedges D and E to lift the wedges from the mold plates. It will be seen that the rollers 170 also engage the shoulders 172 on the side plates A and C to thereby prevent lifting of the entire mold and consequently removal of but one of the wedges. The upper wedge D is carried away by means of a series of rollers 173 acting as a conveyor therefor which carry the wedge entirely above the mold and then drop it upon a cross conveyor 174 leading to the main conveyor 55. The wedge E drops by gravity upon a cross conveyor 175 which also leads to the conveyor 55, the mold being prevented from dropping with the wedge E by the engagement of the notches 172 by the rolls 170 as clearly shown in Figures 10, 11 and 12.

Figure 16:
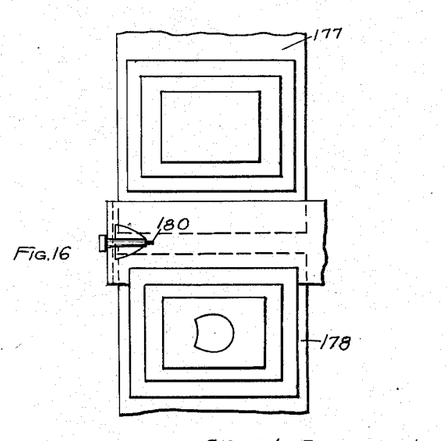
Figure 16 shows the mold completely separated.
Figure 17:
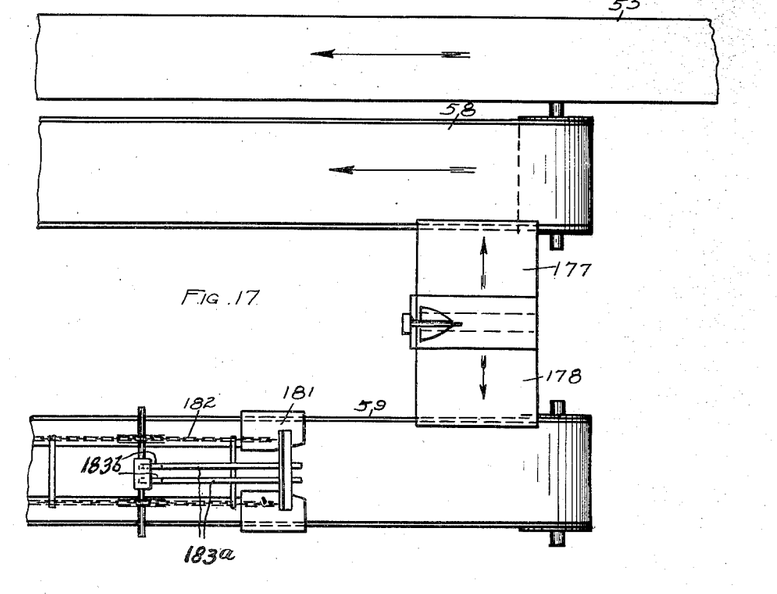
Figure 17 is a plan view of the mechanism for separating the mold and conveying away the parts.
Figures 18, 18A:
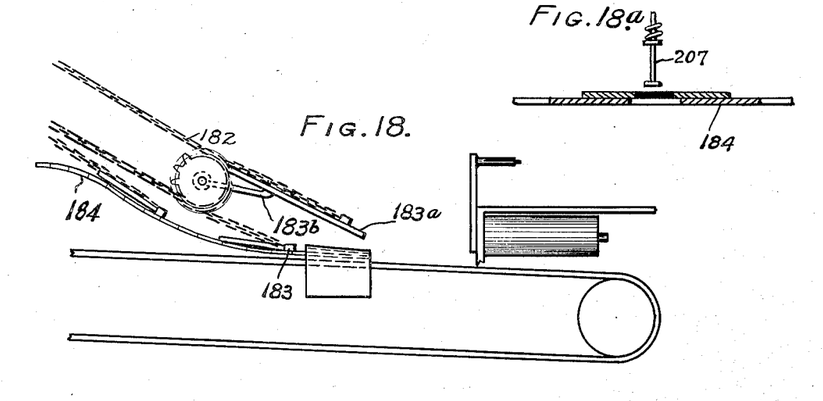

The three plates of the mold are then forced on until they come in contact with a wedge shaped member 176 which separates the two side plates so that each falls outwardly as shown in Figure 16, the top plate A falling upon a cross conveyor 177 which carries it to the main conveyor 58 and the bottom plate C and the center plate B falling together upon a cross conveyor 178 which carries them to the main conveyor 59. In order to insure that the center plate will remain with the bottom plate C the center plate is provided with a shoulder 179 which is engaged by a yielding prong 180 of the separating member 176 and this prong prevents the center plate B from falling with the top plate A.

Figure 19:
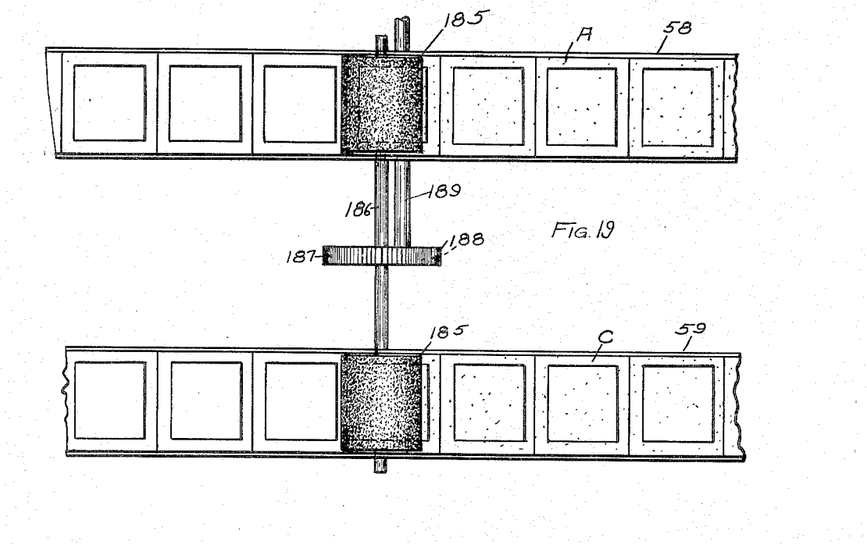
Figure 19 shows the mechanism in plan view.
Figure 20:
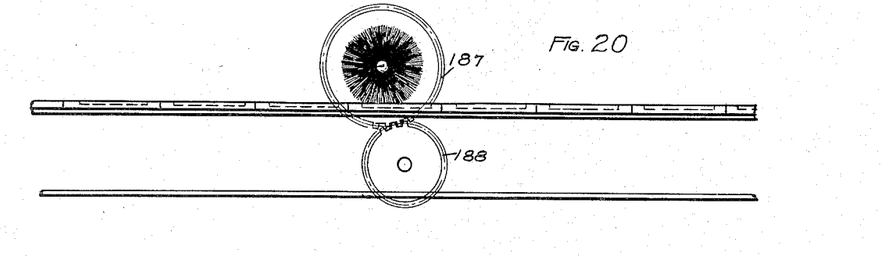
Figure 20 shows an elevation of this same mechanism.

The center plate B and the bottom plate C are carried along the conveyor 59 until they come in contact with cam surfaces 181 which engages the deep portion of the shoulder 179 to thereby raise the center plate B from the bottom plate C and deliver it to a chain conveyor 182 provided with bars 183 adapted to drop back of a center plate and carry it along the slide 184. The bars 183 are guided to engaging position by rods 183ª, supported by bracket 183ᵇ from the sprocket shaft of conveyor 182. The specific type of conveyor here used is immaterial and forms no part of applicant's invention.

As the top section A and the bottom section C are carried along the conveyors 58 and 59 they are engaged by a pair of buffing wheels 185 carried by a shaft 186 driven by means of a gear 187 which is in turn driven by a gear 188 carried by a motor-driven shaft 189. As the center plate is carried along the slide 184 it is operated upon by a plunger 207 (not shown) which engages the heel and knocks it out of the cavity. This plunger may be driven in any suitable manner but is preferably controlled by the advance of the center mold sections in anyone of several ways for example by a contact bearing along the center line of this center plate and completing the circuit to operate the plunger when it engages the center plate rim and breaking the circuit to return the plunger when it engages the rubber in the cavity.

Figure 21:
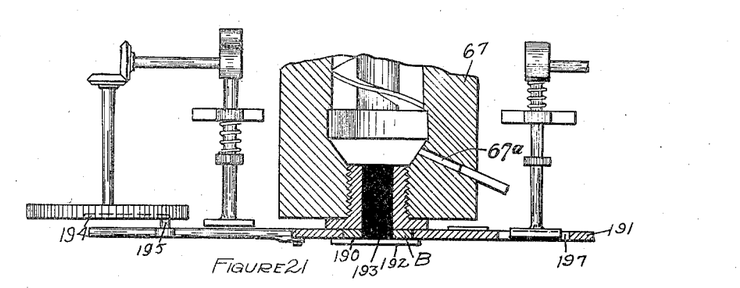
Figure 21 shows the mechanism for placing new blanks in the cavities in the position in which a cavity has just been filled.
Figure 22:
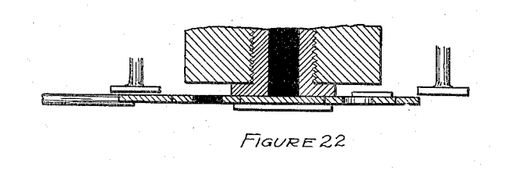
Figure 22 shows this same mechanism in an intermediate position after the filling of the cavity.
Figure 23:
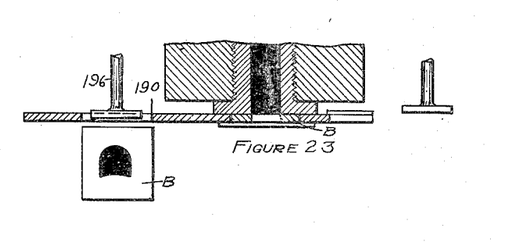
Figure 23 shows the mechanism in position for filling another cavity and discharging a filled cavity.
Figure 24:
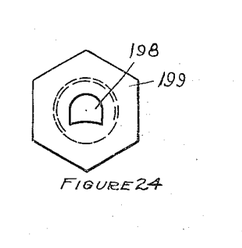
Figure 24 shows the tuber die.
Figure 25:
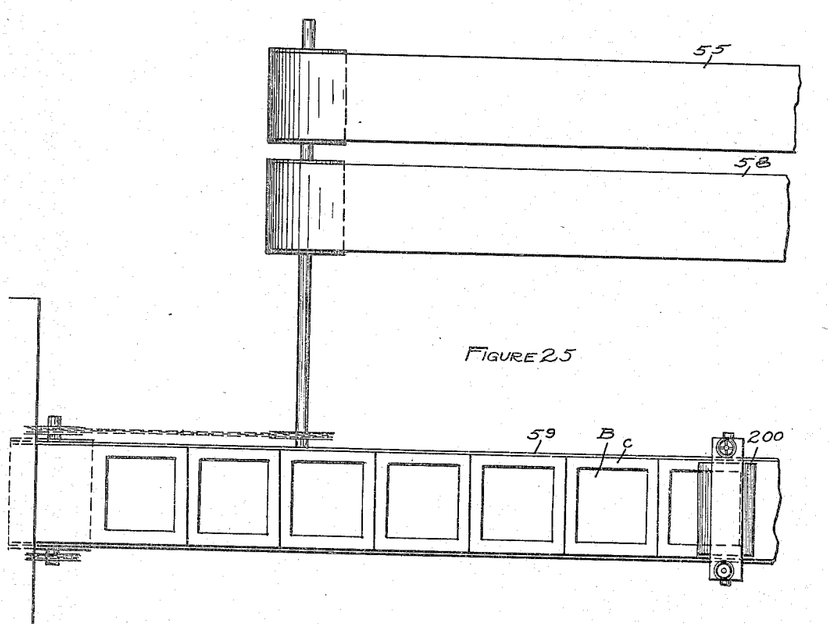
Figure 25 is a plan view of the assembling mechanism.
Figure 26:
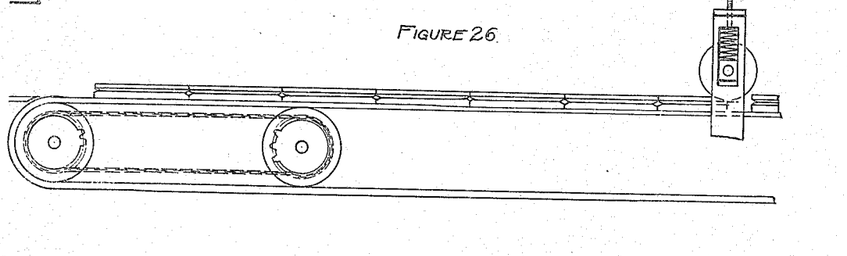
Figure 26 is an elevation of this same mechanism.
Figure 27:
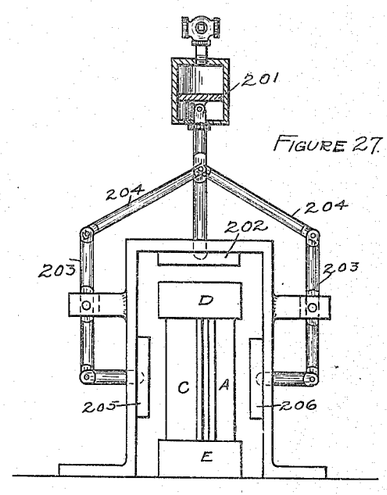
Figure 28:
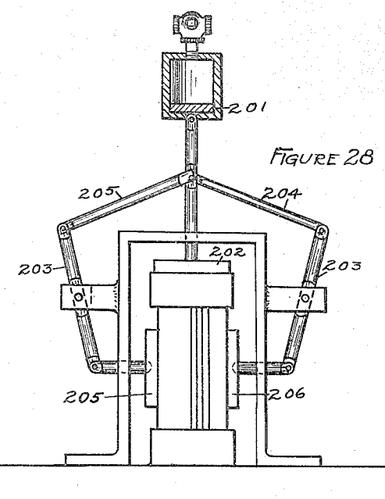
Figure 28 is a second elevation of this same mechanism showing the parts in clamped position.

The cavities in the center plates are filled by stock forced into them directly from the tuber 67. In Figure 21 a center plate B is shown in position in a holder 190 of a carrier 191 and when in this position is backed up by a part 192 which not only acts to support the carrier 191 but also to prevent the stock from passing through the cavity instead of remaining therein. After the cavity is completely filled with stock 193 as shown in Figure 21 the carrier 191 is actuated by means of a cam 194 co-operating with a pin 195 carried by the carrier 191 and the carrier is thereby moved sideways through the intermediate position shown in Figure 22 into the position shown in Figure 23. After reaching this position the plunger 196 advances to remove the filled center plate B from the holder 190 and simultaneously the stock from the tuber flows into the cavity of a new center plate B' which has been placed into the second holder 197 of the carrier 191. In order to prevent undue pressure during the time when the stock is not flowing into any cavity I find it preferable to provide a by-pass 67ª in the tuber 67 and I also find it convenient to arrange so that the stock from this by-pass automatically passes back into the hopper. I also find it desirable to make the aperture 198 in the die 199 substantially the shape of the cavity in the center plate B.

Under certain conditions it may be desirable to use molds in which the center plate could not conveniently be placed in front of the tuber such as the molds which are in common use at the present time, and in such cases two of the center plates of the type above described could be left in the carrier and the plunger 196 modified to punch out the stock blank from the center plate instead of punching out the center plate and blank from the carrier. In operating under such conditions it would only be necessary to have two such center plates for each size heel.

After the cavity has been refilled the mold plates are then manually reassembled by placing the center plate upon the bottom plate C and then placing the top plate A upon the center plate and bottom plate. The three plates are thus assembled upon the conveyor 59 and are carried by this conveyor onto a roller 200 which forces them firmly together. The wedges D and E are then placed on the assembled plates and the entire mold is then placed within the press 69 which is operated by hydraulic pressure acting upon a piston 201 directly connected to a head 202 and connected by means of the force multiplying leverages 203 and 204 to heads 205 and 206. It will be apparent that downward movement of the plunger 201 will cause the heads 205 and 206 to compress the mold plates into the ultimate possible position and that this downward movement of the piston 201 will cause downward movement of the head 202 to force the wedges D and E onto the mold whereupon the mold is ready for reentry into the vulcanizer by way of the channel 71 and the previously described entering mechanism.

The construction and operation of this illustrative embodiment of my invention will be clearly understood from the above description taken in connection with the accompanying drawings and the many advantages thereof will be obvious. It will be understood, however, that the embodiment herein described is illustrative only and that my invention is not limited thereto.

I claim:

1. The combination of means for advancing a series of molds along parallel paths and means for simultaneously guiding and heating said molds during said advance.

2. The combination of a vulcanizer having a series of parallel paths and means whereby molds are forced to traverse said paths in series.

3. The combination of means for advancing a mold and means for automatically unlocking said mold upon advance thereof to permit subsequent separation thereof.

4. The combination of means for advancing a mold and means for automatically completely separating the elements of said mold upon advance thereof.

5. The combination of means for advancing the center plate and one side plate of a mold and means for automatically removing the center plate from the side plate upon advance of said plates.

6. The combination of means for separating the center plate of a mold from a side plate thereof and depositing the center plate on a conveyor, means for removing the article from the cavity of the center plate, and the conveyor for receiving the center plate and carrying it past the article removing means.

7. The combination of means for separating the center plates of a mold from the remainder thereof and depositing each part on a conveyor, means for removing the article from the cavity of the center plate, means for filling said cavity, and means for assembling said parts.

8. The combination of means for removing molds from a vulcanizer and depositing them upon a conveyor, means for separating the cavity bearing plate from the remainder of the mold and depositing it upon a conveyor, and means for removing the article from the cavity as the cavity bearing plate is moved along by the conveyor.

9. The combination of means for removing molds from a vulcanizer, means for separating the mold into its parts and depositing each part upon a conveyor, means for removing the article from the cavity, means for filling the cavity, means for assembling the mold, and means for introducing the molds into the vulcanizer.

10. The combination of means for removing an article from a cavity, means for filling the cavity, and means for assembling the cavity bearing plate with the remainder of the mold.

11. The combination of means for removing an article from a cavity, means for filling the cavity, means for assembling the cavity bearing plate with the remainder of the mold, and means for introducing the mold into a vulcanizer.

In testimony whereof I have signed my name to the above specification.

GEORGE J. MEAD.